United States Patent
Mondragón et al.

(10) Patent No.: US 11,338,838 B2
(45) Date of Patent: May 24, 2022

(54) STEERING WHEEL COVER

(71) Applicant: ADC Solutions Auto, LLC, Costa Mesa, CA (US)

(72) Inventors: Diner Mondragón, Dalton, GA (US); Annette Marie Stroud, Chattanooga, TN (US); Ken Krankkala, Anthem, AZ (US)

(73) Assignee: ADC Solutions Auto, LLC, Costa Mesa, CA (US)

( * ) Notice: Subject to any disclaimer, the term of this patent is extended or adjusted under 35 U.S.C. 154(b) by 239 days.

(21) Appl. No.: 16/661,497

(22) Filed: Oct. 23, 2019

(65) Prior Publication Data

US 2020/0239059 A1 Jul. 30, 2020

Related U.S. Application Data

(60) Provisional application No. 62/817,733, filed on Mar. 13, 2019, provisional application No. 62/798,024, filed on Jan. 29, 2019.

(51) Int. Cl.
*B62D 1/06* (2006.01)
*D06N 3/06* (2006.01)

(52) U.S. Cl.
CPC .............. *B62D 1/06* (2013.01); *D06N 3/06* (2013.01); *D06N 2211/26* (2013.01)

(58) Field of Classification Search
CPC ... B62D 1/06; Y10T 74/2087; Y10T 428/218; Y10T 428/24041; Y10T 428/00; B29C 63/22; B29C 67/0044
See application file for complete search history.

(56) References Cited

U.S. PATENT DOCUMENTS

| | | | |
|---|---|---|---|
| 4,441,382 A | 4/1984 | Snooks | |
| 4,800,776 A | 1/1989 | Strongwater | |
| 5,251,506 A | 10/1993 | Itagaki | |
| 5,287,767 A * | 2/1994 | Engelstein | B62D 1/06 74/558 |
| 7,380,479 B2 | 6/2008 | Landy | |
| 9,975,568 B2 | 5/2018 | Williams | |
| 2013/0333512 A1* | 12/2013 | He | B62D 1/06 74/558 |
| 2014/0053679 A1* | 2/2014 | He | B62D 1/06 74/558 |
| 2015/0217794 A1* | 8/2015 | Kong | B62D 1/06 74/558 |
| 2017/0120845 A1* | 5/2017 | Coley | B62D 1/06 |

FOREIGN PATENT DOCUMENTS

JP 2007062422 A * 3/2007

* cited by examiner

*Primary Examiner* — Jennifer A Steele
(74) *Attorney, Agent, or Firm* — Robert D. Buyan; Stout, Uxa & Buyan, LLP

(57) ABSTRACT

A steering wheel cover including a stretch fabric ring having a c-shaped cross-section forming a three-hundred-sixty angular degree circle, a first frictitious layer lining at least some of the inside of the stretch fabric ring excepting an angular fabric-only portion of the three-hundred-sixty degree circle, and a second frictitious layer covering some of the outside of the stretch fabric ring, but not covering the angular fabric-only portion.

12 Claims, 3 Drawing Sheets

STEERING WHEEL COVER

FIELD OF THE INVENTION

The invention relates to automobile steering wheel covers. More specifically, the invention relates to such covers that form a complete circle and are stretched over the steering wheel for easy installation and removal.

BACKGROUND

Existing covers for automobile steering wheels include stretch-over covers which are simply stretched over the wheel for the easiest possible installation and removal. Such covers are made of stretchable fabric only and lack the frictionality to hold to the steering wheel securely, and lack rigidity, frictionality, and contouring to provide optimal grip by the user. There are also prior art steering wheel covers that are fabric with a sewn in rubberized membrane fully around the outside to provide grip, but these are difficult to apply to a steering wheel because the rubber which must be used to provide sufficient grip is not easily stretchable to reach over the steering wheel, especially when shaped to provide a contoured gripping surface. Still other prior art laminated covers have a layer of fabric on the outside and a stiff frictitious inner layer sewn together, both fully around the cover. These are difficult to install as well, for the reason explained above, even though they do hold on more securely than fabric alone because the fictitious inner layer holds the steering wheel securely after installation. As used herein, the term "frictitious" is meant to refer to something having a surface that is non-slippery.

There exists the need for a stretch-over steering wheel cover which is easy to install, securely grips the steering wheel, and provides secure grip and contour for the user, and such is an object of the invention. Further needs and objects exist which are addressed by the present invention will become apparent by the included disclosure of an exemplary embodiment thereof.

SUMMARY OF THE INVENTION

The invention may be exemplified by or practiced using a steering wheel cover having a non-stretch frictional inner layer laminated to a stretch fabric base layer for much of its diameter, excepting at one or more stretch fabric only portions of its diameter. The cover may additionally have a non-stretch frictional outer layer laminated to the stretch fabric base layer for much of its diameter, excepting at the one or more stretch fabric only portions, for improving grip by the user.

The invention may be exemplified by a steering wheel cover including a stretch fabric ring having a c-shaped cross-section forming a three-hundred-sixty angular degree circle and a first frictitious layer lining at least some of the inside of the stretch fabric ring excepting an angular fabric-only portion of the three-hundred-sixty degree circle. A second frictitious layer may cover some of the outside of the stretch fabric ring, but not the angular fabric-only portion. The second fictitious layer may have outer surface contouring including one or both of convexities and concavities. The convexities may be one or both of bumps and ridges adapted to fit between gripping fingers. The concavities may be depressions for receiving one or both of gripping fingers and palms.

The stretch fabric may be from the group including spandex, elastane, stretch knit, jersey knit, woolen jersey fabric, sweater knit, rib knit, purl knit, bamboo jersey knit, double knit, rayon knit, rayon blend knit, interlock, interlock twist jersey, silk mesh Knit, silk jersey, lycra, cotton-spandex blend, slinky knit, polyester-spandex blend, stretch satin, stretch velvet, nylon-spandex blend, tricot, rayon-spandex blend, acetate-spandex blend, modal-spandex blend, tencel-spandex blend, linen-spandex blend, stretch denim, cotton-poplin blend, stretchable faux leather, stretchable vinyl fabric, stretch lace, powernet, elastane knit, scuba knit, nylon-lycra blend, lace knit, mesh knits, piled knit, terrycloth knit, fleece knit, stretch velvet, and velour. The first and/or second frictitious layers may be PVC. The at least five angular degrees may be less than approximately ninety angular degrees. The at least five angular degrees may be approximately forty angular degrees.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

DETAILED DESCRIPTION OF EXEMPLARY EMBODIMENTS

Figure 1:
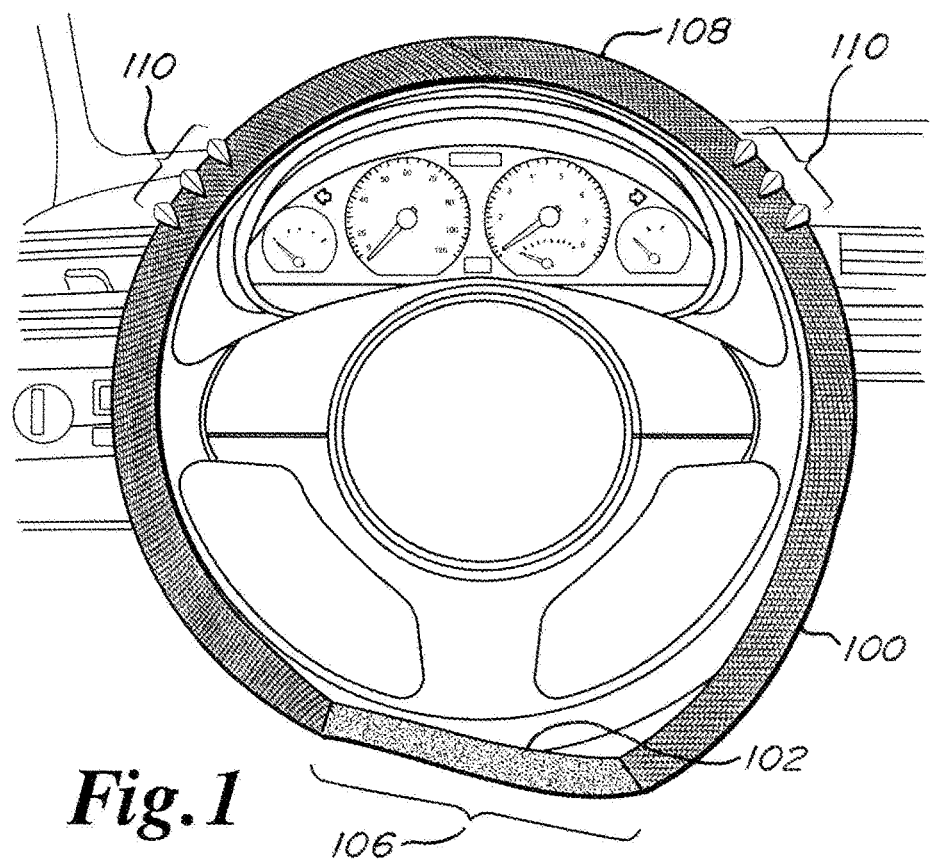
FIG. 1 is an elevation view of a steering wheel cover according to an exemplary embodiment being stretched over an automobile steering wheel.
Figure 2:
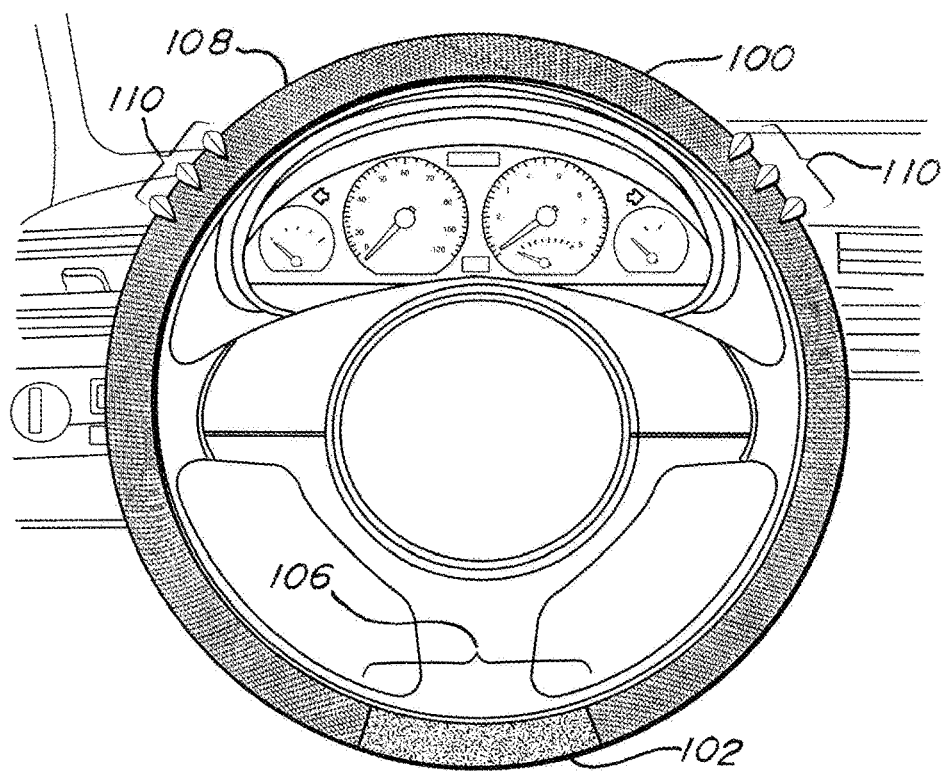
FIG. 2 is an elevation view of the steering wheel cover of FIG. 1 applied to the automobile steering wheel.
Figure 3:
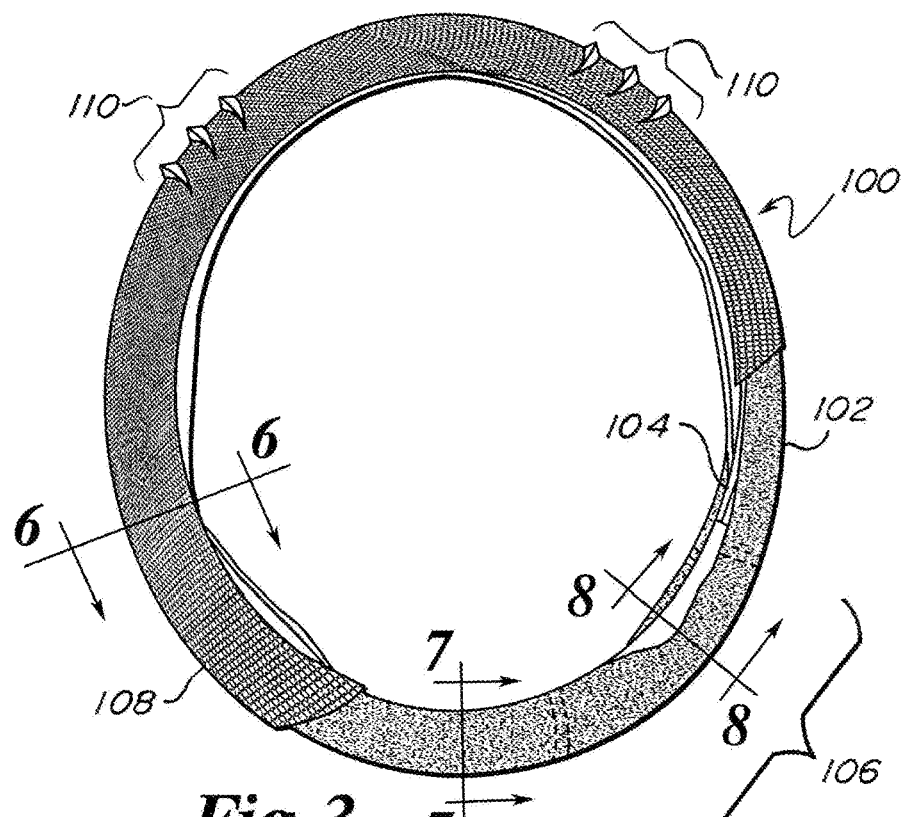
FIG. 3 is a perspective view of the steering wheel cover is FIG. 1.

Referring to FIGS. 1 through 8, a steering wheel cover 100 according to an exemplary embodiment of the invention, useful in practicing the invention, or made in accordance with the invention, is shown.

The cover includes a stretch fabric base ring 102 with a c-shaped cross-section forming a three-hundred-sixty angular degree circle, a frictitious non-stretch layer 104 lining the inside of the stretch fabric base ring excepting an approximately forty angular degree portion 106 of the circle, and a frictitious non-stretch layer 108 covering some of the outside of the stretch fabric ring, but not covering the at least approximately forty angular degree portion.

This outer layer has outer surface contouring 110 which improves grip by the user, provides improved gripping comfort, and indicates to the user where to grip the wheel for safe driving, such as at the commonly recommended "ten o'clock" and "two o'clock" positions. Such outer surface contouring may include one or both of convexities and concavities. The convexities being, for instance, bumps and/or ridges which are intended to fit between the user's fingers and the concavities being, for instance, depressions for receiving the fingers and/or palms.

The cover thereby has elasticity at the forty angular degree portion to easily stretch over and surround a steering wheel, but also has stiffness and frictionality to provide rigidity and to hold to the steering wheel once installed, and to provide improved grip of the steering wheel by the user. While variations from the forty angular degrees of the portion are tolerable, it is found that portions of over ninety angular degrees result in insufficient contraction forces against the wheel and slippage between the cover and wheel, and that portions of less than five degrees result in permanent over-stretching of the fabric during installation, which thereby results in insufficient contraction forces against the wheel and slippage between the cover and wheel. Forty angular degrees is found optimal in securing the cover to the wheel without stretching the fabric in that portion beyond its elastic limit.

The inner layer is preferably made of PVC, but may alternatively be a rubberized material, a stiffer and/or more frictitious fabric, or any other functionally sufficient material, laminated to the stretch fabric layer. The inner layer may be co-molded to the fabric or may be lamented to the fabric by an adhesive or sewing. The inner layer preferably has a textured inside surface to improve its engagement of the steering wheel.

The outer layer is preferably made of PVC and may be co-molded to the fabric or may be pre-molded and then lamented to the fabric by an adhesive or sewing.

The fabric base layer is preferable made of spandex or elastane but may be of any generic stretch fabric (en.wikipedia.org/wiki/Stretch_fabric is incorporated herein by reference). Some other stretchable fabrics which are within the intended definition for the term "stretch fabric" include stretch knit, jersey knit, woolen jersey fabric, sweater knit, rib knit, purl knit, bamboo jersey knit, double knit, rayon knit, rayon blend knit, interlock, interlock twist jersey, silk mesh Knit, silk jersey, lycra, cotton-spandex blend, slinky knit, polyester-spandex blend, stretch satin, stretch velvet, nylon-spandex blend, tricot, rayon-spandex blend, acetate-spandex blend, modal-spandex blend, tencel-spandex blend, linen-spandex blend, stretch denim, cotton-poplin blend, stretchable faux leather, stretchable vinyl fabric, stretch lace, powernet, elastane knit, scuba knit, nylon-lycra blend, lace knit, mesh knits, piled knit, terrycloth knit, fleece knit, stretch velvet, and velour.

Figure 6:
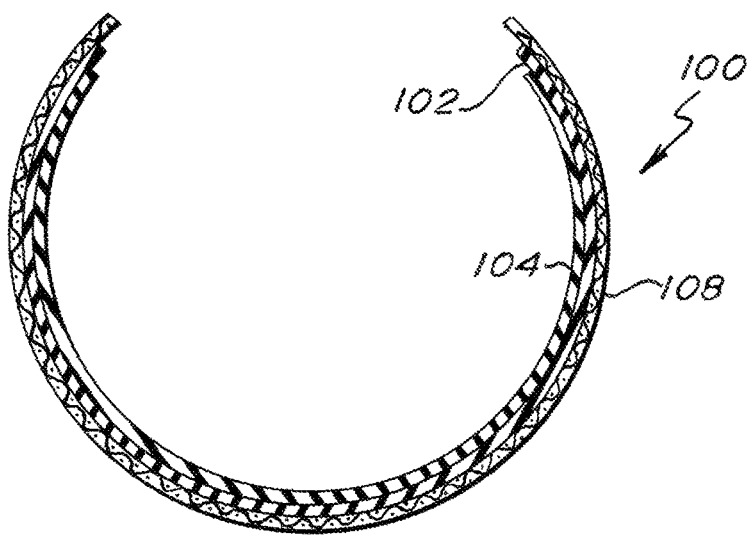
FIG. 6 is a cross sectional view of the steering wheel cover of FIG. 1 taken at line 6-6 of FIG. 3.
Figure 7:
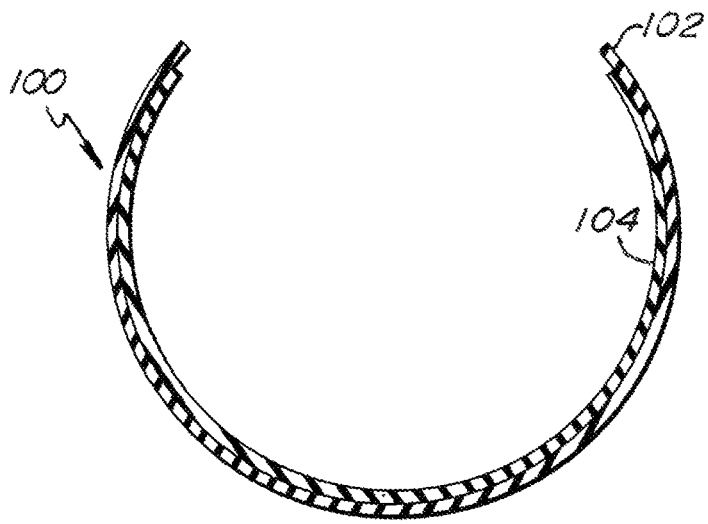
FIG. 7 is a cross sectional view of the steering wheel cover of FIG. 1 taken at line 7-7 of FIG. 3.
Figure 8:
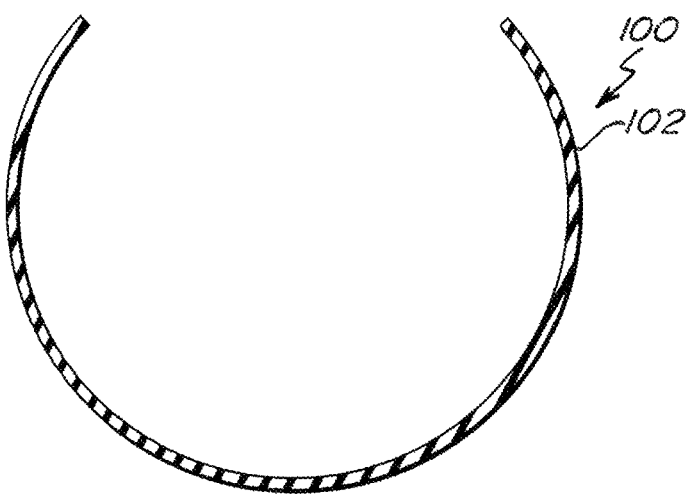
FIG. 8 is a cross sectional view of the steering wheel cover of FIG. 1 taken at line 8-8 of FIG. 3.

By the term "ring with a c-shaped cross-section" to describe the shape of the fabric base layer is meant a toroidal shape as shown in the figures wherein the inwardly-facing wall of the toroid is removed so that in cross-section (FIGS. 6-8) the fabric has the shape of the letter C aiming towards the middle of the steering wheel, continuously around the three-hundred-sixty angular degrees of the circular toroid. The inner and outer layers, where present, have a similar shape in cross section (FIGS. 6 and 7).

Figure 4:
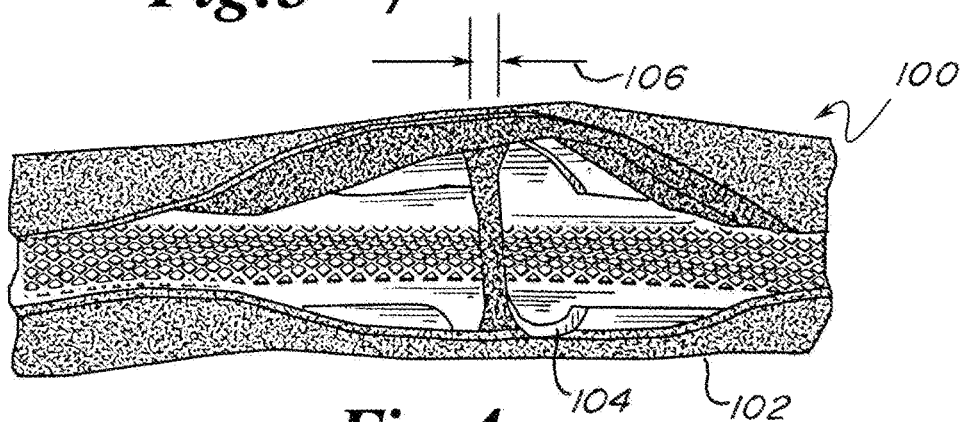
FIG. 4 is a close-up view of the stretch portion of the steering wheel cover of FIG. 1 in its unstretched state.
Figure 5:
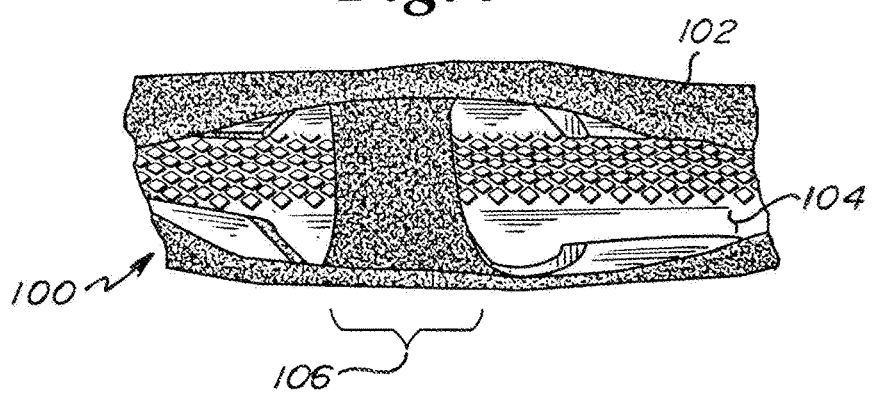
FIG. 5 is a close-up view of the stretch portion of the steering wheel cover of FIG. 1 in its stretched state.

As seen in FIGS. 4 and 5, a fabric-only portion is formed at the forty angular degree gap in the PVC layer. This makes for very easy installation because it can be stretched at the gap for easy installation like a stretch-over cover, yet has the rigidity, grip, and hold-on security of a laminated cover. The "stretch fabric" stretches to allow easy installation and then contracts to pull the inner layer securely against the steering wheel. The contracting pressure provided by the fabric increases the hold of the inner layer to the wheel. The stretch fabric and inner layer thus cooperate to provide the benefits beyond those of prior art covers without any of the drawbacks.

The cover can alternatively be completely made of stretch fabric around its entire diameter and have portions of its diameter laminated with an inner frictional layer at strategic locations, such as at a plurality of equally-spaced locations around the wheel. Preferably, such locations would include the afore-mentioned "ten o'clock" and "two o'clock" positions.

It should be noted that the embodiment shown herein is not intended to limit the scope of the invention. The invention therefore only be limited by the follow claims, including any equivalent interpretation to which they are entitled.

We claim:

1. A steering wheel cover which is mountable on a vehicle steering wheel, said steering wheel cover comprising:
   a stretch fabric ring shaped as a three-hundred-sixty angular degree circle, said stretch fabric ring having a c-shaped cross-section, an inner surface and an outer surface;
   wherein the stretch fabric ring has a lined segment which includes a liner attached to the inner surface thereof, and a fabric-only segment which is devoid of said liner;
   wherein the fabric-only segment occupies a continuous area comprising five to ninety angular degrees of the three-hundred-sixty angular circle defined by the stretch fabric ring;
   wherein the liner comprises a layer of non-slip material which limits the extent to which the lined segment of the fabric ring can stretch; and
   wherein the absence of the liner on the fabric-only portion allows the steering wheel cover to stretch sufficiently to be mounted on the steering wheel.

2. The steering wheel cover of claim 1 wherein the stretch fabric ring comprises a fabric selected from the group of: spandex, elastane, lycra, cotton-spandex blend, polyester-spandex blend, stretch satin, stretch velvet, nylon-spandex blend, tricot, rayon-spandex blend, acetate-spandex blend, modal-spandex blend, tencel-spandex blend, linen-spandex blend, stretch denim, cotton-poplin blend, stretchable faux leather, stretchable vinyl fabric, stretch lace, powernet, nylon-lycra blend, stretch velvet, and velour.

3. The steering wheel cover of claim 1 wherein the non-slip material comprises polyvinyl chloride.

4. A steering wheel cover of claim 1 further comprising:
   a second non-slip layer covering at least some of an outer surface of the lined portion of the stretch fabric ring, but not covering the fabric-only portion.

5. The steering wheel cover of claim 4 wherein the stretch fabric ring comprises a fabric selected from the group of: spandex, elastane, lycra, cotton-spandex blend, polyester-spandex blend, stretch satin, stretch velvet, nylon-spandex blend, tricot, rayon-spandex blend, acetate-spandex blend, modal-spandex blend, tencel-spandex blend, linen-spandex blend, stretch denim, cotton-poplin blend, stretchable faux leather, stretchable vinyl fabric, stretch lace, powernet, nylon-lycra blend, stretch velvet, and velour.

6. The steering wheel cover of claim 4 wherein the second nonslip layer comprises polyvinyl chloride.

7. The steering wheel cover of claim 4 wherein the second non-slip layer is PVC.

8. The steering wheel cover of claim 4 wherein the second non-slip layer has outer surface contouring.

9. The steering wheel cover of claim 8 wherein the outer surface contouring comprises one or both of convexities and concavities.

10. The steering wheel cover of claim 1 wherein the liner comprises a solid layer of non-slip material.

11. The steering wheel cover of claim 4 wherein the fabric only portion occupies approximately forty angular degrees of the three-hundred-sixty angular degree circle.

12. The steering wheel cover of claim 1 wherein the stretch fabric ring comprises a knit fabric selected from the group of: stretch knit, jersey knit, woolen jersey fabric, sweater knit, rib knit, purl knit, bamboo jersey knit, double knit, rayon knit, rayon blend knit, interlock, interlock twist jersey, silk mesh Knit, silk jersey, slinky knit, lace knit, mesh knits, piled knit, terrycloth knit and fleece knit.

* * * * *